US005208954A

United States Patent [19]

Nickerson et al.

[11] Patent Number: 5,208,954

[45] Date of Patent: May 11, 1993

[54] MACHINE FOR THE AUTOMATED FITTING OF INSULATIVE FOAM INSERTS INTO MASONRY BUILDING BLOCKS

[75] Inventors: David L. Nickerson, Wilbraham; Jeffrey A. Nickerson, Warren, both of Mass.

[73] Assignee: Insulated Concrete Corporation, Mass.

[21] Appl. No.: 736,690

[22] Filed: Jul. 26, 1991

[51] Int. Cl.[5] .......................... B29D 22/00; E04B 2/00

[52] U.S. Cl. ...................................... 29/33 K; 29/451; 29/797; 29/897.3; 52/405

[58] Field of Search ............... 29/33 K, 451, 429, 771, 29/789, 797, 786, 793, 897.3; 52/405, 98, 100

[56] References Cited

U.S. PATENT DOCUMENTS

| | | | |
|---|---|---|---|
| 3,343,251 | 9/1967 | Augsburger | 29/451 |
| 4,275,539 | 6/1981 | Abbott, III | 52/405 X |
| 4,295,810 | 10/1981 | Dennert et al. | 52/405 X |
| 4,509,252 | 4/1985 | Sabatino et al. | 29/753 X |
| 4,529,562 | 7/1985 | Connett et al. | 52/309.9 X |
| 4,584,744 | 4/1986 | Haines | 29/33 K |
| 4,631,885 | 12/1986 | Iannarelli | 52/405 |
| 5,062,244 | 11/1991 | Ducharme | 52/405 X |

*Primary Examiner*—Z. R. Bilinsky
*Attorney, Agent, or Firm*—Chapin, Neal & Dempsey

[57] ABSTRACT

Machine for the automated fitting of insulative foam inserts into the cores of masonry building blocks includes a frame for straddling, in superposed relation, a masonry block conveyor. The machine has a magazine section for sequentially feeding pairs of laterally compressible inserts linked together in juxtaposed relation by a frangible web of the foam material. The machine includes a vertically reciprocal tamping mechanism for moving each of the linked-pairs of inserts sequentially from the magazine section into the cavities of building blocks being carried on the block conveyor disposed below the machine. The machine further includes adjacent throat channels vertically aligned with the tamping mechanism and with the cores of each building block positioned to receive the inserts therein. The channels are each defined, in part, by a central wedge having its apex disposed upwardly to sever the web and separate the linked-pair of inserts as each is moved through the channels past the wedge. Each channel is substantially narrower at its lower end than the corresponding dimension of the insert in order to compress the same laterally for fitting or "stuffing" into the cores of the blocks in side-by-side relation.

9 Claims, 3 Drawing Sheets

MACHINE FOR THE AUTOMATED FITTING OF INSULATIVE FOAM INSERTS INTO MASONRY BUILDING BLOCKS

BACKGROUND OF THE INVENTION

This invention relates to the automated fitting of insulative foam inserts into the cores of masonry building blocks and, more particularly, to a machine which laterally compresses pairs of inserts and fits them sequentially into the cores of building blocks in compressed condition.

While the use of foam inserts in building blocks has been known for some time, it has generally been the practice to manually fit such inserts into the cores of the building blocks at the block plant or the building site.

It has also been known to insulate the cavities, or cores, in masonry building blocks by injecting expandable or foamable polymeric materials, including thermoplastic beads, or particles, such as polystyrene and causing the particles to foam in-place within the cavities of the masonry blocks.

The following patents disclose various methods and apparatus of the type heretofore used in insulating masonry blocks: U.S. Pat. No. 4,151,239, dated Apr. 24, 1979, U.S. Pat. No. 4,275,539, dated Jun. 30, 1981 and U.S. Pat. No. 4,295,810, dated Oct. 20, 1981.

The '239 and the '810 Patents, referred to above, disclose methods of filling the cavities of masonry blocks with expandable, foamable insulating materials. In those methods, however, the materials costs are not commensurate with the quantum of improvement in the R-value of the blocks so-insulated. This failing was apparently recognized by Abbott in the '539 Patent, supra, in which a building block is placed upon a lower platen 30 with an upper platen 34 having a downwardly extending plug member 36. Steam passages are formed with openings communicating with the surrounding spaces into which the resin particles are injected. The result is that the polystyrene liner 24, when foamed in situ, is of sufficient thickness to provide adequate insulation in the block without the excessively high materials cost of the earlier methods. It will be recognized by those skilled in the art, however, that this later method and apparatus are not entirely suitable for use at conventional building sites or block plants because of its complexity, high cost and the specialized skills required for properly operating such apparatus.

Accordingly, the principal object of this invention is to provide an improved method and apparatus for fitting preformed insulative foam inserts into the cores or cavities of building blocks which are inexpensive, easy to use and can be operated at the block plant or building site by operators who may not possess the necessary special skills or special training of the type required for carrying out the previously available methods. The inserts are preferably of the type disclosed in out co-pending application entitled: INSULATIVE FOAM INSERTS FOR MASONRY BUILDING BLOCKS, Ser. No. 07/726,973, filed Jul. 8, 1991.

Another object of this invention is to provide a machine for simultaneously fitting pairs of compressible insulative foam inserts into the cores of masonry building blocks by compressing each of the inserts as they are being inserted into the cores of such blocks.

The above and other objects and advantages of this invention will be more readily apparent from the following description read in conjunction with the accompanying drawings, in which.

Figure 1:
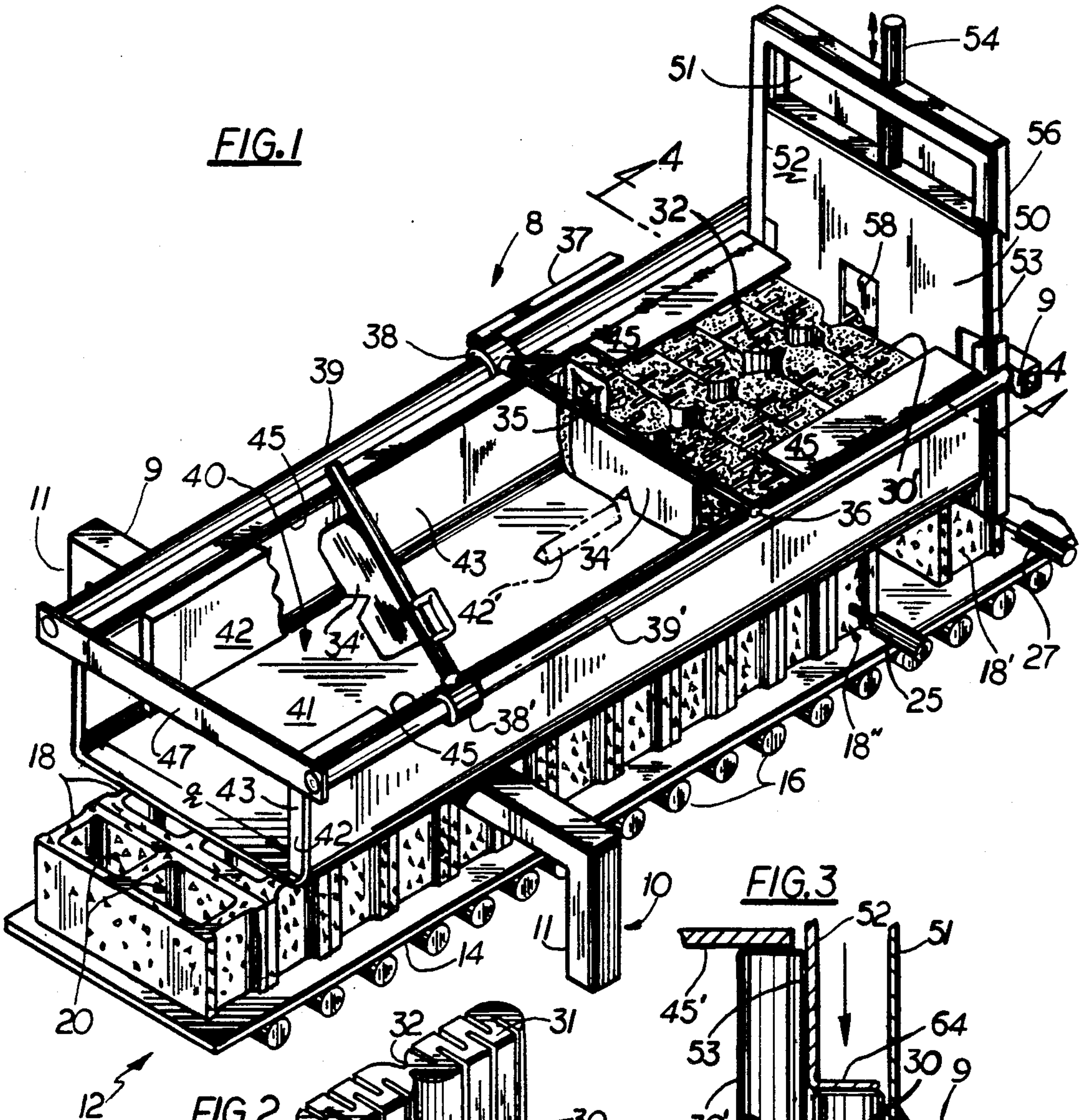
FIG. 1 is a perspective overall view of a machine of the type embodying the present invention.

A machine 8 of the type embodying this invention is shown in FIG. 1 and comprises a tubular frame, indicated generally at 10, having cross-beams 9 and depending legs 11. The frame is adapted to support the machine 8 in generally vertically spaced, superposed relation over a building block conveyor system, indicated generally at 12. The machine is adapted to fit pairs of inserts 30 (FIG. 3) into the cores 20 of building blocks 18. The conveyor may comprise a belt 14 driven by any suitable means supported on a plurality of spaced, rotatable rolls 16 adapted to support, on the conveyor, a line of masonry building blocks 18. The masonry blocks may be of any suitable size and shape of the type conventionally fabricated of precast concrete, or masonry compositions, as widely used in residential and commercial construction.

Figure 2:
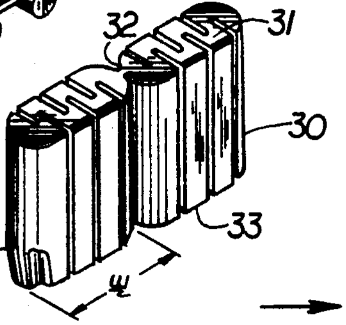
FIG. 2 is a perspective view showing a linked-pair of foam inserts of the type adapted for use in the machine of FIG. 1.
Figure 4:
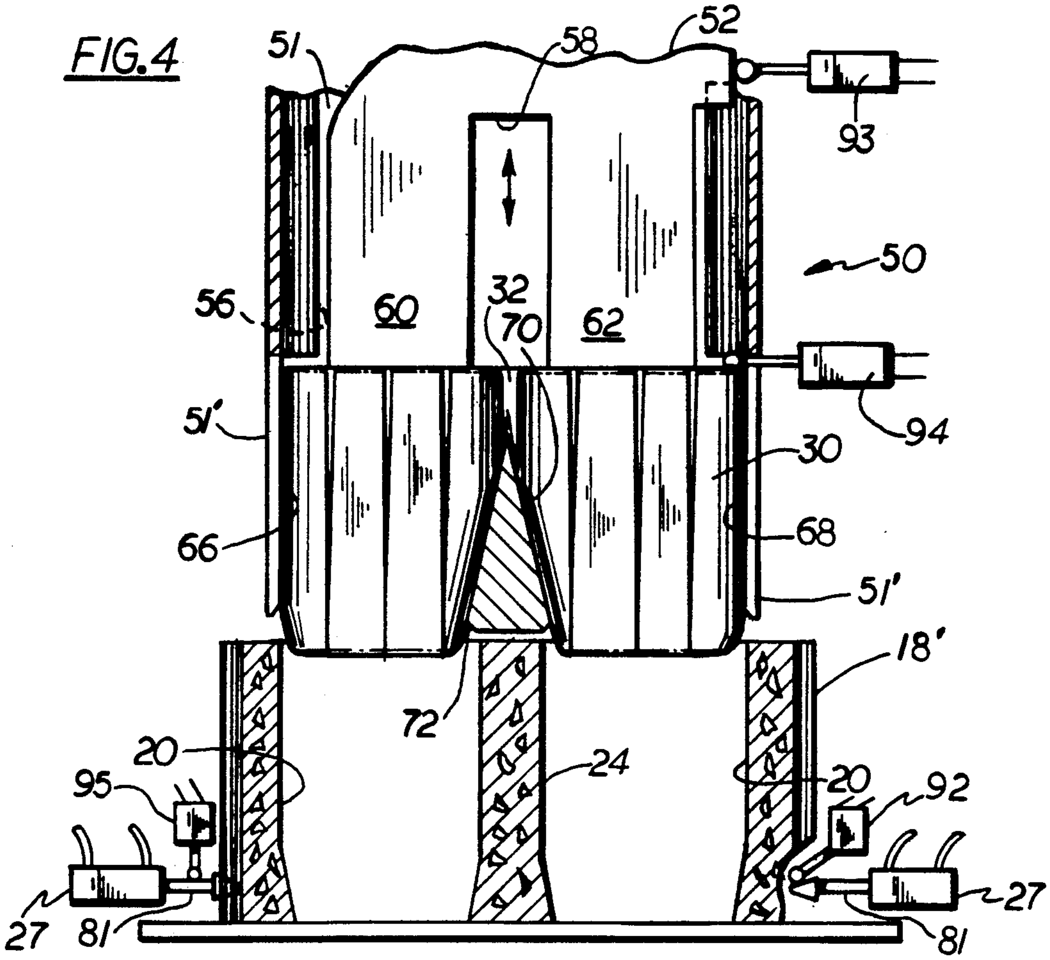
FIG. 4 is a sectional view taken along line 4—4 of FIG. 1.
Figure 5:
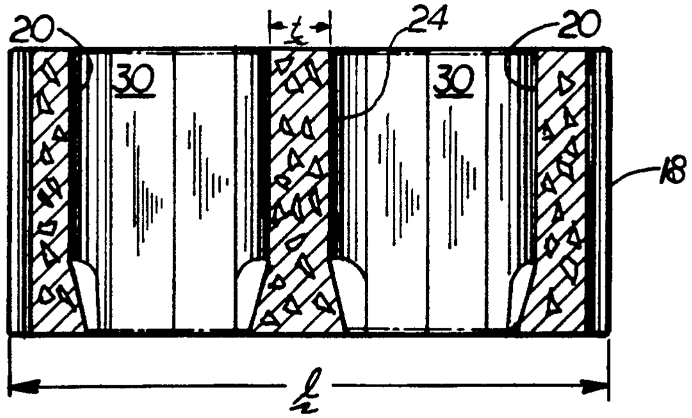
FIG. 5 is a cross-sectional, elevational view of the pair of inserts of FIG. 3 after having been separated and inserted into the cores of the building blocks.
Figure 6:
FIG. 6 is a top plan view showing the inserts disposed with the cores of a building block.

As depicted in FIGS. 1 and 6, each of the blocks 18 includes a pair of hollow cavities, or cores 20, disposed on opposite sides of a transverse web 24. Building blocks are available in various sizes and in one block, the two cores 20 may be of the same size or different size and in different blocks, the web 24 (FIG. 5) may vary in thickness t from about one-inch to approximately two-inches at its upper end. As best shown in FIGS. 4 and 5, the web 24 and outer walls of the cores 20 of blocks 18 are tapered inwardly toward the bottom thereof whereby, at the lower ends, the cores are substantially smaller in cross-section than at their upper ends. The difference in the lateral dimension at the top and bottom ends of the cores is on the order of about one inch and, for this reason, the insulative foam inserts 30 are also substantially tapered in width w (FIG. 2) from top 31 to bottom 33 to accommodate the taper of the cores 20, as more fully disclosed in our co-pending application, previously referred to. The inserts 30 are each also laterally compressed by the machine for fitting into cores of different size, as will hereinafter be more fully described.

Figure 3:
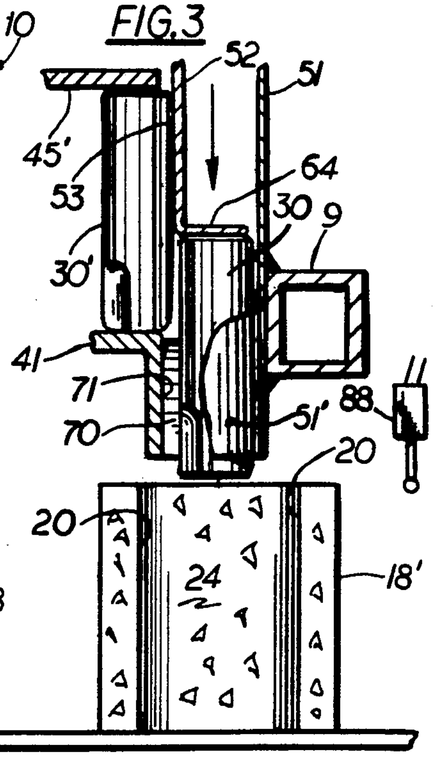
FIG. 3 is a partial, side elevational view, in cross-section, to illustrate the operation of the machine of FIG. 1.
Figure 7:
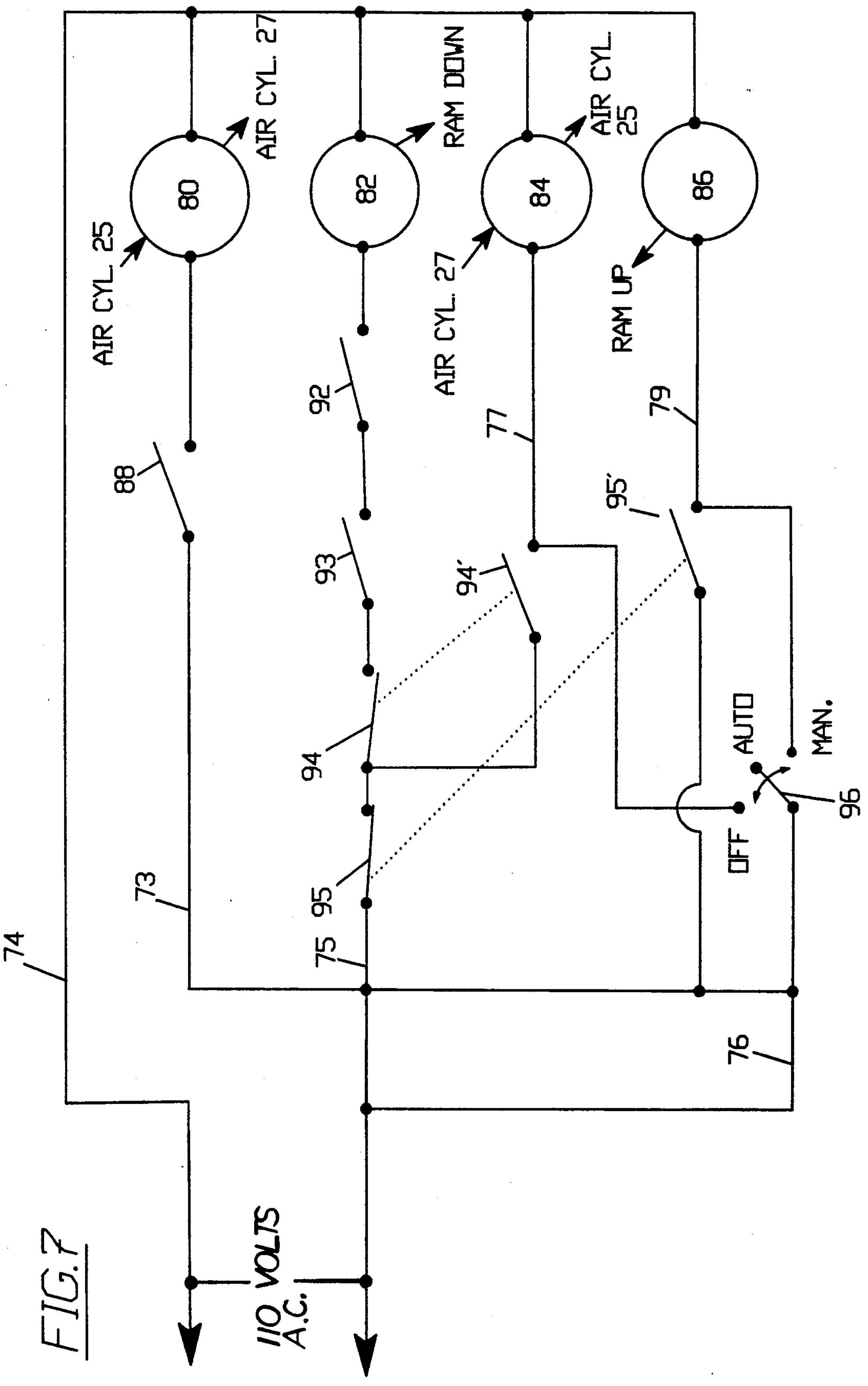
FIG. 7 is a schematic wiring diagram showing an electrical system for controlling the operation of the machine.

The conveyor 12 may be programmed to move intermittently for advancing the blocks 18 to be successively fitted with laterally compressible, insulative inserts 30 adapted to fit snugly in-place within the cores of various size building blocks. In the illustrative embodiment, two pairs of pneumatically operated cylinders, shown at 25 and 27 in FIGS. 1 and 4, are longitudinally-spaced on each side of the block conveyor 12. The cylinders are controlled by an electric circuit, as shown in FIG. 7, which will hereinafter be more fully described. It is significant to note, however, that plungers, when thrust outwardly by the cylinders 27 disposed on opposite sides of the conveyor, will "stop" the leading block 18' for the "stuffing cycle" during which the inserts 30 are fitted into the cores of the block 18'. The next block in line, identified as 18", will be "held" by the outward extension of the plungers of the pair of cylinders 25 and its movement arrested until block 18' has been moved ahead by the conveyor a predetermined distance beyond its loading point where it will strike a limit switch 88 (FIGS. 3 and 7). The limit switch 88 will cause cylinders 25 to retract their plungers, thereby releasing block 18" and cause cylinders 27 to extend their plungers into the path of movement of each succeeding block to "stop" the latter for the next "stuffing cycle." It has been found that the machine 8 may be operated with a "stuffing cycle" of approximately three seconds per pair of inserts and that this rate can be reasonably maintained so long as the conveyor is provided with an adequate supply of masonry blocks and the machine is supplied with a sufficient number of foam inserts.

The machine 8 comprises a feed or magazine section 40 (FIG. 1) of generally U-shaped cross-section having a horizontal lower wall 41 and upright side walls 43 which, at their upper ends, flare outwardly and terminate in an outwardly, extending lip 45 for easy loading of the inserts into the channel-shaped magazine. Adjacent the tamping head 52, the magazine is provided with a pair of relatively wide flanges 45' on each side of the channel to ensure that the inserts will not be displaced or disoriented as a result of the operation of the tamping mechanism 50. The magazine 40 is upwardly open for readily receiving therein pluralities of linked pairs of inserts 30 arranged in a horizontal stack or line of vertically oriented, abutting pairs. The channel 40 has a predetermined width a which is slightly larger than the overall lateral dimension or width of the maximum size of the linked inserts so that the central web 32, linking together the inserts 30, will be located approximately at the centerline of the feed section. This arrangement will properly align the inserts with a vertically reciprocable ram, or tamping mechanism 50, as will hereinafter be more fully described. To ensure proper alignment of inserts, of smaller overall width, shim panels 42 may be provided, as warranted, for removable placement along the side walls 43 of the channel 40. In an alternative embodiment, an upstanding rib or bead, shown in phantom at 42', may, in lieu of panels 42, be disposed along the centerline of the channel 40 to fit within the open space below the lower end of the web 32 whereby the linked inserts 30 will be guided along the centerline of the channel 40.

The aligned inserts 30 are continuously urged toward the tamping mechanism 50 by one of two blades or paddles 34 and 34' disposed in radial relation on rods 36 which extend from the cylindrical collars 38. The collars are axially slidable and rotatably disposed on horizontal rods 39 and 39' disposed longitudinaly along both sides of the magazine 40. With the use of two such paddles, the reloading of the channel 40 with additional inserts can be readily accomplished without interruption of the reciprocable tamping mechanism 50. The rods 39 and 39' are each supported at one end by a bracket 47 and, at the opposite end, by a similar support bracket (not shown). Means, such as a constant force spring may be mounted on each side of the frame 10 and be connected at one end, as illustrated at 37, with each of the sleeves 38 and 38' to urge the paddles 34 and 34' toward the tamping assembly 50. The linked pairs of inserts 30 are thus continuously fed toward the tamping assembly for successive insertion into the forwardmost masonry block 18' (FIG. 1) disposed directly below the tamping head. The sleeves 38, being rotatable on rods 39 and 39', will enable the paddles 34 to be swung upwardly and downwardly by handles 35 into and out of the magazine 40 enable to reloading with inserts 30. In the illustrated embodiment, the magazine has a capacity of approximately forty pairs of inserts. It will be recognized, however, that this number can be increased significantly by the simple expedient of lengthening the channel-shaped magazine 40 and the associated feed means or paddle 34. In any case, whenever the line of inserts is reduced so that only a few remain in the magazine 40, a new supply may be loaded behind the first paddle 34 which may at that time be in its operative position, urging the inserts toward the tamper mechanism 50. The second paddle 34', in its retracted location on the other side of the machine, may then be vertically swung downward into operative position in the magazine 40 so as to urge the additional supply of inserts forwardly. The forward paddle 34 may then be swung upwardly and moved rearwardly, ready for the next reloading cycle. This arrangement ensures uninterrupted operation of the tamping mechanism 50 in fitting the inserts 30 into blocks 18.

The tamping assembly 50 comprises a stationary backboard of plate 51 and a vertically reciprocable ram or tamping head 52 operated by connecting rod 54 driven by a pneumatically, or hydraulically, operated cylinder (not shown). The fixed plate 51 has a planar upper portion with a smooth or polished front surface and forwardly curved, side wall portions 51'. This plate serves to arrest the horizontal movement of the lead pair of linked inserts 30 and position the same for the tamping stroke. It also assists in guiding the vertical movement and of compressing the inserts as they are moved into the cavities of a block 18, as depicted in FIG. 3.

The tamping head 52 comprises a sheet metal plate also having a planar and smooth, or polished, forward face 53 to provide for easy-sliding movement against the forward face of the penultimate insert 30' (FIG. 3). The side edges 55 (FIG. 1) of the tamping head extend rearwardly at right angles to the face 53 and form slide means adapted, such as by Teflon strips, for low frictional sliding movement within the U-shaped channel frame 56. The tamping head also includes, at the center thereof, a downwardly opening notch, or cutout 58, which divides the lower portions of the head into two downwardly depending leg portions 60 and 62, each including, at the lower end thereof, a rearwardly extending foot 64, as best shown in FIG, 3, for engaging the upper surface of each insert 30 over a relatively broad surface area to minimize the possibility of damage to the inserts as they are rammed into the cores of blocks 18.

The machine 8 also includes, in vertically registered relation with the tamping head 52, a pair of laterally-spaced channels, throat sections or guideways 66 and 68, defined by the oblique sides of the wedge 70, front wall 71 and the lower side wall portions 51' which extend forwardly of the plane of plate 51 and may be curved to accommodate the curved ends of the inserts. The central wedge 70 serves to separate each linked-pair of inserts 30 into discrete inserts and together with the curved outer side walls 51', laterally compress each insert for fitting into the cores 20 of an underlying masonry block 18, as depicted in FIG. 4. The wedge 70, having its apex of the wedge 70 disposed upwardly and its base disposed adjacent the lower end of the channels 66 and 68, will break apart, rupture or shear the web 32 and laterally compress the individual inserts between the oblique edges of the wedge 70 and side wall portions of channels 66 and 68. At its base, the width of the wedge 70 is preferably somewhat larger than webs 24 of maximum width found in the largest size of conventional building blocks. Usually, this wedge dimension is approximately two-inches in width and will compress the inserts sufficiently to fit into the cores of currently available masonry building blocks. At the lower end, the wedge 70 is preferably provided with an inwardly tapered, truncated conical section 72 which serves to gradually release the compression on the upper ends of the inserts as they are moved past the wedge 70. It has been found that section 72 greatly reduces the likelihood of damage to the upper surface of the insert as it is being released from its fully compressed state by the lower end of the wedge.

The machine embodying this invention may be controlled by any suitable means, including a software program based on a computer-controlled system or by an electrical control system of the type shown in the schematic wiring diagram of FIG. 7. This system includes solenoids 80, 82, 84 and 86 which are connected in circuit with conductor wires 74 and 76, connected to an electrical energy source which may be 110 volts. Each of the solenoids is connected in parallel to the energy supply by electrical conductors 73, 75, 77 and 79. The flow of electrical energy in each of these conductors is controlled by one or more limit switches operable in response to the horizontal movement of building blocks 18 on the conveyor and to the reciprocal movement of the tamping head or ram 52. In FIG. 7, those switches, which are shown in closed condition, are normally "closed" and those that are in open condition are normally "open." Limit switch 88, in conductor 73, when "closed", is adapted to energize solenoid 80 to control the pneumatic operation of both pairs of cylinders 25 and 27. When cylinder 27 causes its plungers 81 (FIG. 4) to be extended into the path of the lead block 18' to "stop" the same for the "stuffing cycle," at the same time, cylinders 25 will retract their plungers to allow the continued forward movement of the other blocks on the conveyor. Limit switch 88 (FIGS. 3 and 7) is normally "open" and is located a predetermined distance downstream of the stop cylinders 27 which is related to the width of the blocks being processed, such as 8-inches to 12-inches. When the first or a previously-stuffed block comes into contact with the limit switch 88, it will actuate the same, causing compressed air to flow into one end of the stop cylinders 27 to cause the stop plungers 81 to be extended into the path of movement of the lead block 18'. At the same time, solenoid 80 will operate holding cylinders 25 to retract the holding plungers to allow continued movement of the remainder of the blocks on the conveyor.

When the tamping head 52 has moved to the top of its stroke, normally open limit switch 92 (FIGS. 4 and 7) will be actuated as the lead block 18' is "stopped" by plungers 81 of cylinders 27. Solenoid 82 will thus be energized to cause the tamping head to be moved downward to ram the leading pair of inserts 30 into the cores of the leading masonry block 18'. At the lower end of the tamping stroke, limit switch 94, (FIGS. 4 and 7) in circuit 75, will be actuated to "open" that circuit and thereby "close" gang connected switch 94', in circuit 77. Solenoid 84 will thus be energized, causing air flow into the opposite ends of cylinders 27 to retract the stop plungers 81 which had been engaged with the masonry block 18' thereby, actuating limit switch 95 (FIGS. 4 and 7) to "open" cutting off the energy supply to solenoid 82 and "closing" gang switch 95' to conductor 79. Solenoid 86 will be simultaneously energized to return the tamping head to its top position. At the same time that cylinders 27 retract the stop plungers 81, the plungers of cylinders 25 will be extended to hold the next block 18" in line. The block 18' is thus released and is moved forward by the conveyor to clear the loading station. Movement of the block 18' out of the loading station will actuate the limit switch 88 (FIG. 3) as described above. Solenoid 82 cannot be energized to move the tamping head downward unless a block 18' is "stopper" and properly positioned on the conveyor below the tamping head and, as sensed by limit switch 93, has been returned to its topmost position ready for the next down stroke. The solenoids 84 and 86, respectively, cannot be energized to retract the ram and the plungers of cylinders 27 unless or until the switches 94 and 95, in conductor 75, are both "open" thereby closing switches 94' and 95' to retract the plungers of the air cylinders 27. To deal with a malfunction of the machine, a three-position selector switch 96 is provided. In its "AUTO" position, the system will operate as described. In its "OFF" position, solenoid 84 will be energized directly by connecting conductor 77 to the energy source to retract the plungers of cylinders 27. When in "MAN" position, switch 96 will energized solenoid 86 directly by connecting conductor 79 to the energy source to return the ram to its "up" position.

OPERATION

With the circuit in FIG. 7 energized and compressed air being supplied to the pneumatic cylinders of the system, the machine 8 will be ready for operation when loaded with a supply of inserts 30 and the tamping head will be in its "up" position with limit switch 93 closed. As depicted in FIG. 1, one of the paddles 34 will be disposed in its downward position, urging the inserts toward the tamper head 52, at the same time, masonry blocks 18 will be moving along the conveyor 12 toward the tamping head or loading system. When a block contacts the limit switch 88, solenoid 80 will be energized and the stop plungers will be extended by cylinders 27, stopping the lead block 18'. As stop cylinder plungers 81 are extended, limit switch 92 will be closed to energize solenoid 82 and cause the tamper head 52 to be moved downwardly by the ram cylinder whereby the lead insert 30 will be rammed into the cores 20 of the underlying masonry block 18'. When the down stroke is completed, the limit switch 94 will be actuated, closing switch 94 to energize in solenoid 84. The stop plungers 81 of cylinders 27 will be retracted from the path of the masonry blocks, actuating limit switch 95 and the holding plungers of cylinders 25 will be extended to hold block 18". Solenoid 82 will thus be de-energized and solenoid 82 will be simultaneously energized by switch 95' to cause the ram to retract, ready for the next cycle of operation of the system initiated by the contact of the just-insulated block 18' with limit switch 88 which, again, energizes solenoid 80 to release the blocks to move toward the stop cylinders 27. Preferably, the holding cylinders 25, stop cylinders 27 and limit switch 88 would be mounted on a frame located alongside the conveyor and be adjustable longitudinally to control accurately the operation of the system for use with block which may vary in width from 8-inches to 12-inches.

Having thus described my invention, what is claimed is:

1. Machine for fitting insulative foam inserts sequentially into the cores of masonry building blocks carried by a conveyor, said machine comprising a base for supporting said machine in spaced relation with a section of the conveyor by which the building blocks are adapted to be carried, a magazine adapted to receive and support a line of said inserts in generally perpendicular orientation to said conveyor, reciprocating tamping means for sequentially moving at least one of said inserts in said line into the cores of said building blocks and means for continuously urging the line of inserts toward said tamping means and guide means disposed in registered relation with the tamping means for laterally compressing the inserts as they are moved into said building blocks.

2. Machine for fitting insulative foam inserts into the cores of building blocks, as set forth in claim 1, in which said inserts comprise pairs of inserts linked together in side-by-side relation by a frangible web and in which said guide means includes a wedge shaped member for breaking apart said web to separate the linked-pair of inserts into discrete inserts, each thereby being individually insertable by the tamping means into the cores of building blocks.

3. Machine for fitting insulative foam inserts into the cores of building blocks, as set forth in claim 1, in which said magazine comprises an upwardly opening U-shaped channel adapted to receive therein a line of the linked-pairs of inserts and in which said means for urging said inserts toward the tamping head comprises at least one paddle disposed to contact the outermost insert and being longitudinally movable toward the tamping head by a constant force spring.

4. Machine for fitting insulative foam inserts into the cores of building blocks, as set forth in claim 3, in which said tamping head comprises a metal sheet having outer edge portions slidable in a U-shaped guideway for reciprocal motion during a tamping cycle and having a downwardly opening slot aligned with the wedge for movement thereby during said cycle and, at its lower end, having foot portions adapted to engage the upper surface of the inserts which make up said linked-pairs.

5. Machine for fitting insulative foam inserts into the cores of building blocks, as set forth in claim 3, in which said means of feed the line of inserts along a given path comprises two paddles, each being longitudinally movable within the channel in which the line of inserts are disposed, each of said paddles being pivotable into and out of said channel for selectively urging some or all of the inserts toward the tamping head.

6. Machine for fitting insulative foam inserts into the cores of building blocks, as set forth in claim 5, in which said means urging said paddles toward said tamping head comprises constant force springs and in which said wedge has an apex disposed toward the magazine and a base portion disposed toward the conveyor, the lateral dimension of the base portion being at least as great as the widest dimension of the web portions of said building blocks wherein the wedge will cause the breakup of the frangible web and the compression of each insert moved through the guide means for individually fitting the inserts into the cores of blocks having transverse webs of different sizes.

7. Machine for fitting insulative foam inserts into the cores of building blocks, as set forth in claim 6, in which said means is provided for selectively controlling the operation of the reciprocal tamping means and for selectively stopping the lead of one of said blocks in registered relationship with the tamping head during the tamping cycle.

8. Machine for fitting insulative foam inserts into the cores of building blocks, as set forth in claim 7, in which the tamping head includes a sheet metal tamper with a smooth forward face for sliding movement against the penultimate pair of linked inserts when the leading insert is being rammed into an underlying block registered therewith and in which the tamping head includes a back plate with a smooth forward face to arrest the forward movement of the leading insert pairs in position for the ramming cycle and for guiding the same into cores of the building blocks.

9. Machine for fitting insulative foam inserts into the cores of building blocks, as set forth in claim 8, in which the magazine channel includes in-turned flanges which are of sufficient width adjacent the tamping head to prevent the linked-pairs of inserts adjacent the tamping head from becoming dislodged during the reciprocal movement thereof.

* * * * *